(12) United States Patent
Bevan et al.

(10) Patent No.: US 6,519,395 B1
(45) Date of Patent: Feb. 11, 2003

(54) FIBER OPTIC ARRAY HARNESS

(75) Inventors: Dennis P. Bevan, Westlake Village, CA (US); John E. Mansell, Thousand Oaks, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/564,846

(22) Filed: May 4, 2000

(51) Int. Cl.[7] .............................................. G02B 6/44
(52) U.S. Cl. ...................................... 385/100; 385/113
(58) Field of Search ................................. 380/100, 103, 380/113, 134–136

(56) References Cited

U.S. PATENT DOCUMENTS 4,761,052 A * 8/1988 Buekers et al. ............. 350/96.2
5,007,701 A * 4/1991 Roberts ..................... 350/96.2
5,199,100 A   3/1993 Maas et al.
5,631,993 A * 5/1997 Cloud ........................ 385/135
5,692,299 A * 12/1997 Daems et al. ................. 29/869
5,751,879 A   5/1998 Jenkins et al.
5,907,653 A   5/1999 Small et al.

FOREIGN PATENT DOCUMENTS

GB   2 138 965 A   10/1984
GB   2 159 291 A   11/1985

* cited by examiner

*Primary Examiner*—Khiem Nguyen
(74) *Attorney, Agent, or Firm*—Lynn & Lynn

(57) ABSTRACT

A fiber optic array cable comprises a plurality of constituent cables that each include an optical fiber, a strength member connected to the optical fiber to provide tensile strength and a jacket surrounding the optical fiber and the strength member. A harness is arranged to enclose the plurality of constituent cables securely. The strength member preferably is formed of a plurality of metal strands layered around the optical fiber.

3 Claims, 3 Drawing Sheets

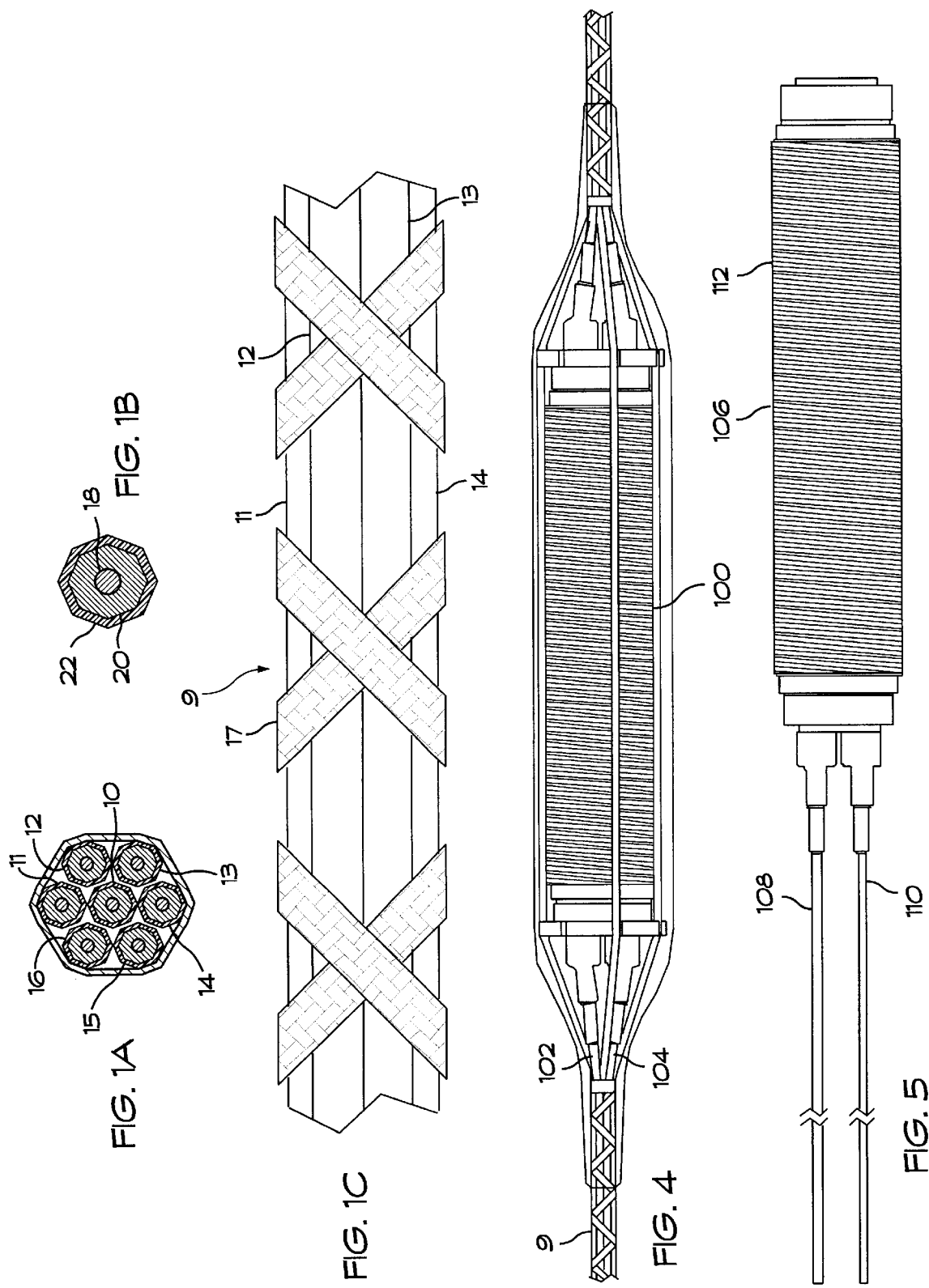

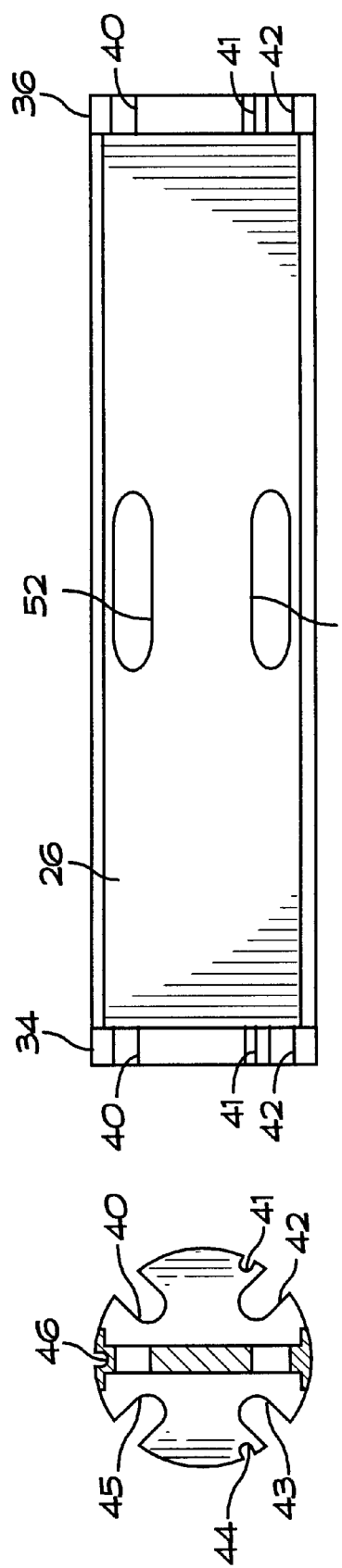
FIG. 3A
FIG. 3B
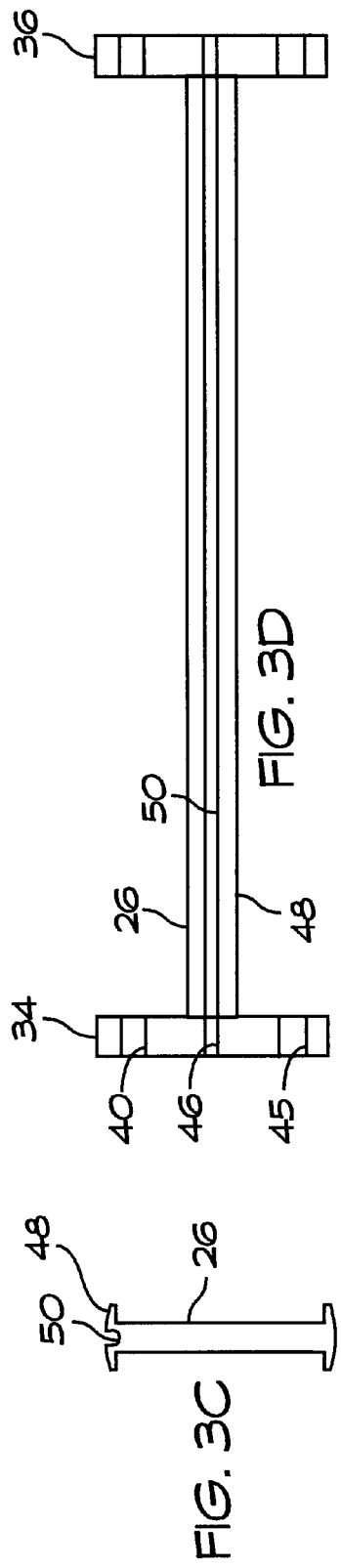
FIG. 3D
FIG. 3C

FIBER OPTIC ARRAY HARNESS

STATEMENT OF GOVERNMENT RIGHTS IN INVENTION

The United States Government has rights in this invention under contract No. N00039-95-C-0072.

BACKGROUND OF THE INVENTION

This invention relates generally to techniques for constructing fiber optic sensor arrays, particularly fiber optic hydrophone arrays. Still more particularly, this invention relates to techniques for constructing towed and bottom fiber optic hydrophone arrays.

A towed array generally includes hydrophones and telemetry couplers spliced together and packaged loosely within a foam body, which is then placed within a strength member frame and booted within a hose. For bottom arrays, integration occurs by cutting into a pre-fabricated cable and, once integrated, the hydrophones and telemetry couplers are overmolded for protection.

Generally, for both approaches, the optical fiber used between hydrophones and telemetry components is either tight buffered, in a loose tube (loose buffered), or has the standard thin acrylate buffering. This makes them tend to be susceptible to damage, especially at either splice locations or at transition points from the outer jacketing to the bare fiber.

SUMMARY OF THE INVENTION

A fiber optic array cable according to the present invention comprises a plurality of constituent cables that include an optical fiber, a strength member connected to the optical fiber to provide tensile strength and a jacket surrounding the optical fiber and the strength member. A harness is arranged to enclose the plurality of constituent cables securely.

The strength member preferably comprises a plurality of metal strands layered around the optical fiber.

The fiber optic array cable may further comprise at least one breakout connected to selected constituent cables and arranged to contain array components while maintaining the tensile strength provided by the strength member in each optical fiber to which array components are connected.

The breakout preferably includes a base and a pair of end caps connected to the base. Cable terminators are connected to selected constituent cables and anchored in the end caps to maintain tensile strength.

The constituent cables preferably include fiber optic hydrophone leads and leads for connection to telemetry components in a fiber optic hydrophone array.

BRIEF DESCRIPTION OF THE DRAWINGS

FIG. 1A is a cross sectional view of an array cable that is included in a fiber optic sensor array showing a plurality of jacketed optical fibers retained in a harness according to the present invention;

FIG. 1B is an expanded scale cross sectional view of one of the jacketed optical fibers included in the array cable of FIG. 1A.

FIG. 1C is a side elevation view of a portion of the apparatus of FIG. 1A;

FIGS. 3A–3D illustrate a breakout housing and breakout base that may be used with the array cable of FIGS. 1A–1C to form a fiber optic hydrophone array;

FIG. 4 shows a first hydrophone formed using the array cable of FIGS. 1A–1C and the breakout housing of FIGS. 2A, 2B and FIGS. 3A–3D; and FIG. 5 shows a second hydrophone formed using the array cable of FIGS. 1A–1C and the breakout housing of FIGS. 2A, 2B and FIGS. 3A–3D.

DETAILED DESCRIPTION OF THE INVENTION

Figure 2A:
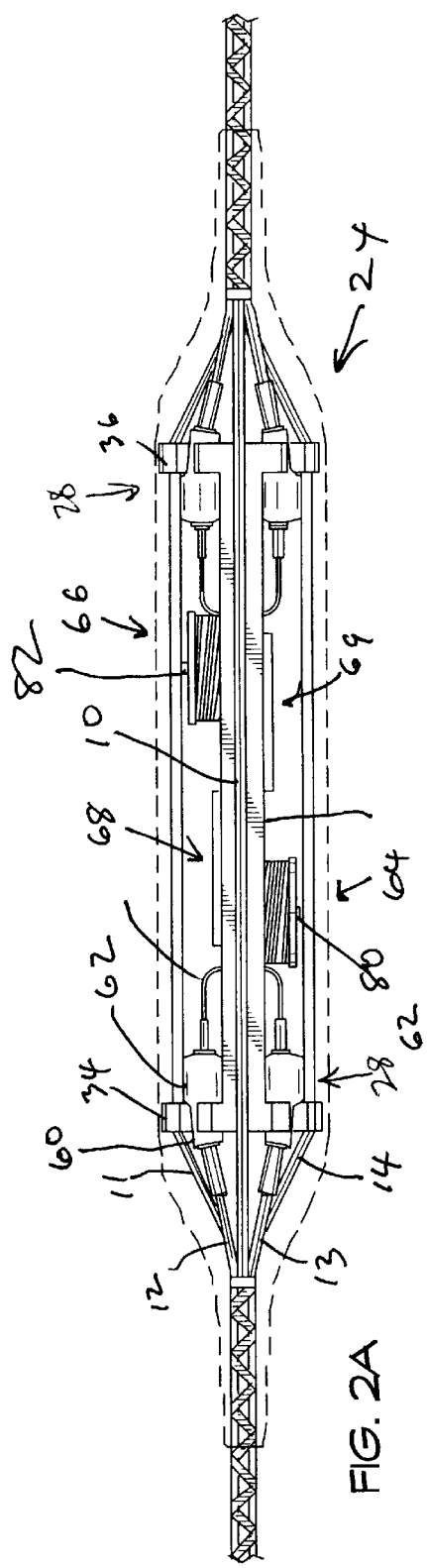
FIG. 2A shows optical fiber components inside a breakout housing.

FIG. 1A shows an array cable 9 formed to include a plurality of constituent cables 10–16 secured within a harness 17. The constituent cables 10–16 may be formed to essentially identical. FIG. 1B illustrates the components of each of the constituent cables 10–16. For example, an optical fiber 18 passes axially through the axial center of the constituent cable 10. A plurality of metal strands 20 are then layered about the outside of the optical fiber 18. The metal strands 20 around the optical fiber 18 function as a strength member that protects the optical fiber from breaking when tension is applied to the array cable 9. The metal strands 20 are then covered with a jacket 22 formed of a material such as nylon. In this way, each constituent cable 10–16 has its own internal strength member and is individually armored to protect it from the outside environment. The constituent cables 10–16 are then placed in parallel alignment and wrapped with the harness 17 as shown in FIGS. 1A and 1C. The harness 17 may be formed of straps of nylon, dacron or other similar substance. The array cable 9 is bound together using some such means as tape, interwoven string, injected polyurethane (or polyethylene) jacketing or dacron lacing tape.

The diameter of the array cable assembly 9 preferably is about 0.19". The preferred range of diameters of the array cable assembly 9 is from about 0.18" to 0.0195". The working strength of the array cable assembly 9 is typically about 50 pounds, and its breaking strength is at least 150 pounds. Typical lengths of the array cable 9 used in forming a hydrophone array range from about 10 to 100 meters.

Any number of constituent cables 10–16 may be secured in the harness. Seven constituent cables 10–16 are shown to illustrate the principles of the invention. In addition, each of the constituent cables 10–16 may include a plurality of optical fibers (not shown) instead of a single optical fiber 18 as described with reference to FIG. 1A.

Constructing a fiber optic hydrophone array begins with constructing lengths of array cables 9 as described above. The ends of the constituent cables 10–16 are secured and tension is applied to them. The harness 17 is then bundled on the constituent cables 10–16 until the area where the hydrophone is to be integrated. Splices and components such as optical couplers, delay coils, hydrophones etc. are then integrated into the array cable 9 as described subsequently using a breakout housing 24. As shown in FIGS. 2A, 2B and 3A–3D, the breakout housing 24 includes a breakout base 26 connected between two end caps 34 and 36. As shown in the top plan view of FIG. 3A, the breakout base has a flat, rectangular shape. In the side elevation view of FIG. 3D, the breakout base 26 and the end caps 34 and 36 cooperate to form a wide H-shaped structure with the end caps 34 and 36 being the upright portions of the "H" and the breakout base 26 being the cross bar. The end caps 34 and 36 are essentially identical.

As shown in FIGS. 3A and 3B, the end cap 34 is formed to have a generally thin cylindrical shape. A plurality of slots 40–46 that are preferably generally U-shaped are formed in the curved side of the end cap 34. The slots 40–46 are angularly spaced apart and extend the full length of the end cap 34 parallel to its longitudinal axis. The slots 40, 42, 43 and 45 are cable termination slots. The slots 41, 43 and 46 are bypass cable slots.

As shown in FIGS. 3B–3D, an edge 48 of the breakout base 26 may include a lengthwise slot 50 that is aligned with the slot 46 in the end cap 34. As shown in FIG. 3A, the breakout base 26 preferably includes openings 52 and 54 that allow optical fiber to be passed from one side of the breakout base 26 to the other.

Figure 2B:
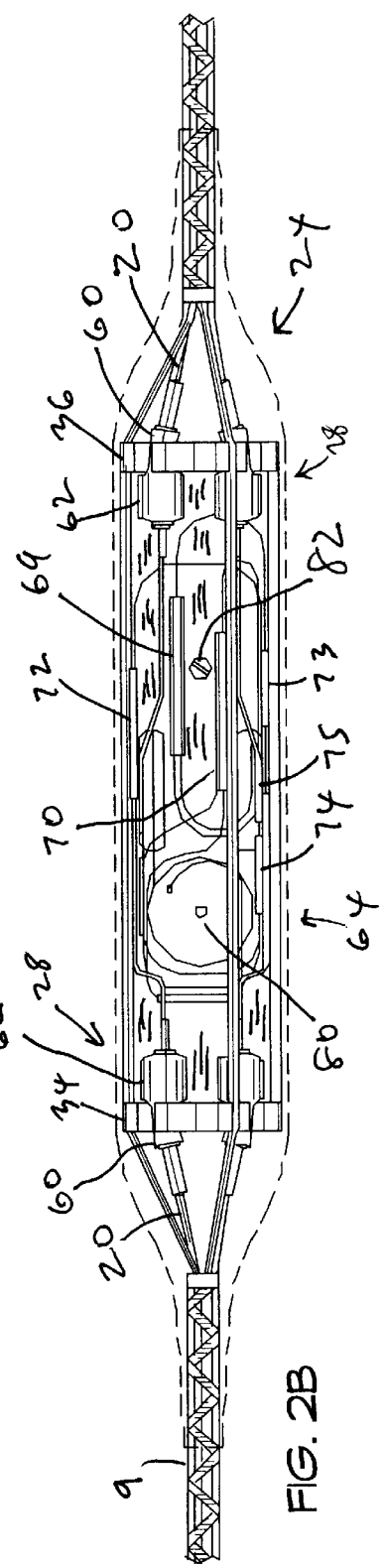
FIG. 2B shows the apparatus of FIG. 2A rotated 90°.

Referring to FIGS. 2A and 2B, when integrating the breakout housing 24 into the array cable 9, constituent cables 10, 11 and 14 that will not be used in the breakout housing 24 are routed through the cable bypass slots 41, 43 and 46 in both end caps 34 and 36. Constituent cables 12, 13, 15, 16 to which components are to be spliced are cut where splices are to be formed. Cable terminators 28 are securely connected to the strength members 20 of the constituent cables 12, 13, 15, 16 where they pass through the end caps 34 and 36 at the cable termination slots 40, 42, 43 and 45. The cable terminators 28 are formed as stepped cylinders having a smaller diameter portion 60 that passes through the cable termination slots 40, 42, 43 and 45 and a larger diameter portion 62 having a diameter sufficiently large that it will not pass through the cable termination slots 40, 42, 43 and 45 when the constituent cables 12, 13, 15 and 16 are under tension.

The structure of the array cable 9 as described above, the cable terminators 28 and the breakout housing cooperate to provide a sturdy structure in which array components may be mounted without breaking the optical fibers in the constituent cables 9–16. For example, FIGS. 2A and 2B show delay coils 64 and 66, couplers 68–70 and associated splices 72–75 inside the breakout housing 24. The delay coils 64 and 66 may be secured to the breakout base 26 with suitable fasteners such as screws 80 and 82. Splice protectors and coupler housings may be secured to the breakout base by a suitable adhesive.

Figure 2C:
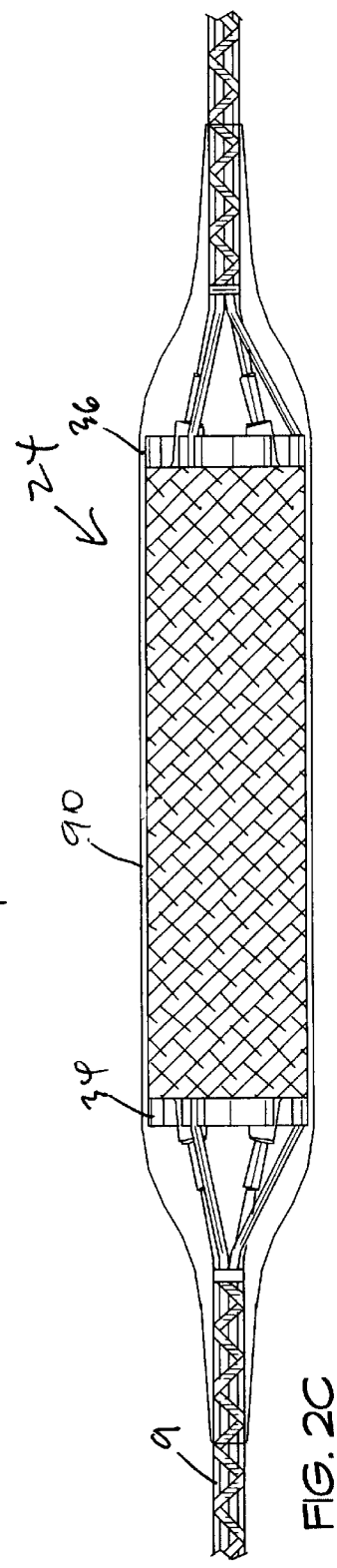
FIG. 2C shows the final assembly of the harness and breakout housing.

The fibers passed to the interior of the breakout housing are spliced to the telemetry components and secured to the breakout tray 26. The breakout cavity is preferably filled using a hard epoxy resin to protect the components and splices from the environment. The entire unit can then be overmolded with a polyurethane or polyethylene cover 90 as shown in FIG. 2C. The horizontal portion 34 of the tray 32 is used to hold the splices, optical couplers and any other telemetry components that the telemetry scheme may dictate.

Additionally, the leads from the hydrophones included in the sensor array are made from the same constituent cables used in the harness.

In an array, a plurality of breakout housings substantially identical to the breakout housing 24 are used to house the telemetry couplers and to serve as a means to protect splices and bare fiber areas, terminations are fittings which contain the strength member portion of the constituent cable, but allow the center fiber(s) to pass through and into the breakout housing. The terminations are arranged in a symmetric pattern in the end caps 34 and 36 of the breakout tray 26 in such a way as to use the tray 26 to assist in the load bearing scheme of the array. Any constituent cables which do not need splices in the breakout are passed about the exterior of the tray.

As shown in FIG. 4, a hydrophone 100 is constructed such that its leads 102 and 104 are made from the selected constituent cables in the array cable 9. When the hydrophone 100 is integrated into the array cable 9, those constituent cables which are not in use are cut and terminated to one side of the hydrophone. The hydrophone leads then replace those unused cables between the hydrophone and the breakout housing. All other constituent cables are then run about the exterior of the hydrophone. The hydrophone can then be overmolded in the same manner as described above for the breakouts.

FIG. 5 shows another fiber optic hydrophone 106 that may have constituent cables 108 and 110 arranged as its leads and connected to a breakout housing 112 according to the present invention.

When all work terminating the breakouts is complete, molds are applied and the cavity is filled with a hard epoxy resin and allowed to cure. After cure, outer molds are applied and the outer molding material is injected and allowed to cure. These steps are repeated in a serial manner until the array is complete.

This array design can be used as is for an ocean bottom cable, molded to a consistent diameter throughout for seismic applications, or placed in foam and booted into a hose for a towed array.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic array cable, comprising:

a plurality of constituent cables, each constituent cable comprising an optical fiber and a strength member connected to the optical fiber to provide tensile strength, the plurality of constituent cable including a pair of fiber optic hydrophone leads;

a harness arranged to enclose the plurality of constituent cables securely; and a breakout housing connected to selected constituent cables and arranged to contain array components while maintaining the tensile strength provided by the strength member to each optical fiber to which array components are connected wherein the breakout housing includes a base and a pair of end caps connected to the base and wherein cable terminators are connected to selected constituent cables, the end caps including slots arranged for engagement with the cable terminators to maintain tensile strength.

2. The fiber optic array cable of claim 1 wherein the strength member comprises a plurality of metal strands layered around the optical fiber.

3. The fiber optic array cable of claim 1 wherein the harness comprises a fabric tape jacket wrapped around the plurality of constituent cables.

\* \* \* \* \*